(12) United States Patent
Ledder et al.

(10) Patent No.: US 8,606,713 B1
(45) Date of Patent: Dec. 10, 2013

(54) COMPUTER IMPLEMENTED METHOD FOR ACCUMULATING MONEY

(75) Inventors: Emily Ann Ledder, Fredericksburg, TX (US); Mark S. Ledder, Fredericksburg, TX (US)

(73) Assignee: Ledder High Risk Capital Ventures, LP, Fredericksburg, TX (US)

( * ) Notice: Subject to any disclaimer, the term of this patent is extended or adjusted under 35 U.S.C. 154(b) by 0 days.

(21) Appl. No.: 13/439,610

(22) Filed: Apr. 4, 2012

Related U.S. Application Data

(60) Provisional application No. 61/471,588, filed on Apr. 4, 2011.

(51) Int. Cl.
*G06Q 40/00* (2012.01)

(52) U.S. Cl.
USPC .............................. 705/42; 705/35; 434/127

(58) Field of Classification Search
USPC ...................................... 434/127; 705/35, 42
See application file for complete search history.

(56) References Cited

U.S. PATENT DOCUMENTS

| | | | | |
|---|---|---|---|---|
| 6,173,272 | B1 * | 1/2001 | Thomas et al. ................. | 705/42 |
| 6,513,018 | B1 * | 1/2003 | Culhane ......................... | 705/35 |
| 6,847,942 | B1 * | 1/2005 | Land et al. ...................... | 705/30 |
| 7,880,642 | B2 | 2/2011 | Gueziec | |
| 8,055,564 | B2 * | 11/2011 | Wehunt et al. ................. | 705/35 |
| 8,090,656 | B2 * | 1/2012 | Solomon et al. ............... | 705/42 |
| 8,341,074 | B1 * | 12/2012 | Reid ................................ | 705/38 |
| 2002/0161630 | A1 * | 10/2002 | Kern et al. ...................... | 705/14 |
| 2004/0044616 | A1 * | 3/2004 | Salter ............................... | 705/38 |
| 2004/0131997 | A1 * | 7/2004 | McGuire et al. ............... | 434/127 |
| 2005/0165684 | A1 * | 7/2005 | Jensen et al. ................... | 705/44 |
| 2007/0198382 | A1 * | 8/2007 | Ferrari ............................. | 705/35 |
| 2008/0167980 | A1 * | 7/2008 | Aaron et al. .................... | 705/35 |
| 2009/0271287 | A1 * | 10/2009 | Halpern ........................... | 705/26 |
| 2010/0138287 | A1 | 6/2010 | Hoque | |
| 2010/0138341 | A1 * | 6/2010 | Solomon et al. ................ | 705/42 |
| 2010/0332243 | A1 * | 12/2010 | Weigman et al. .............. | 705/1.1 |
| 2011/0078073 | A1 * | 3/2011 | Annappindi .................... | 705/38 |
| 2012/0030091 | A1 * | 2/2012 | Hu et al. ......................... | 705/38 |
| 2012/0084177 | A1 * | 4/2012 | Tanaka et al. .............. | 705/26.41 |
| 2013/0060623 | A1 * | 3/2013 | Walker et al. .............. | 705/14.27 |

* cited by examiner

*Primary Examiner* — Chika Ojiaku
(74) *Attorney, Agent, or Firm* — Buskop Law Group, PC; Wendy Buskop

(57) ABSTRACT

A computer implemented method for accumulating money using a client device, server, and network can include presenting a user interface, creating a user profile, forming an account for accumulating money linked to another account, enabling the user to input goals, and enabling the user to make and receive deposits into the account for accumulating money. The deposits can include an amount of money selected by the user, an amount of money saved by not purchasing a product or service, an amount of money saved by purchasing a lower priced product or service, or an amount of money associated with a non-monetary goal. The computer implemented method can include transmitting prompts to the client device with suggestions on how to save money, determining a progress towards the goals, displaying the progress, and displaying an updated monetary amount to be accumulated.

23 Claims, 12 Drawing Sheets

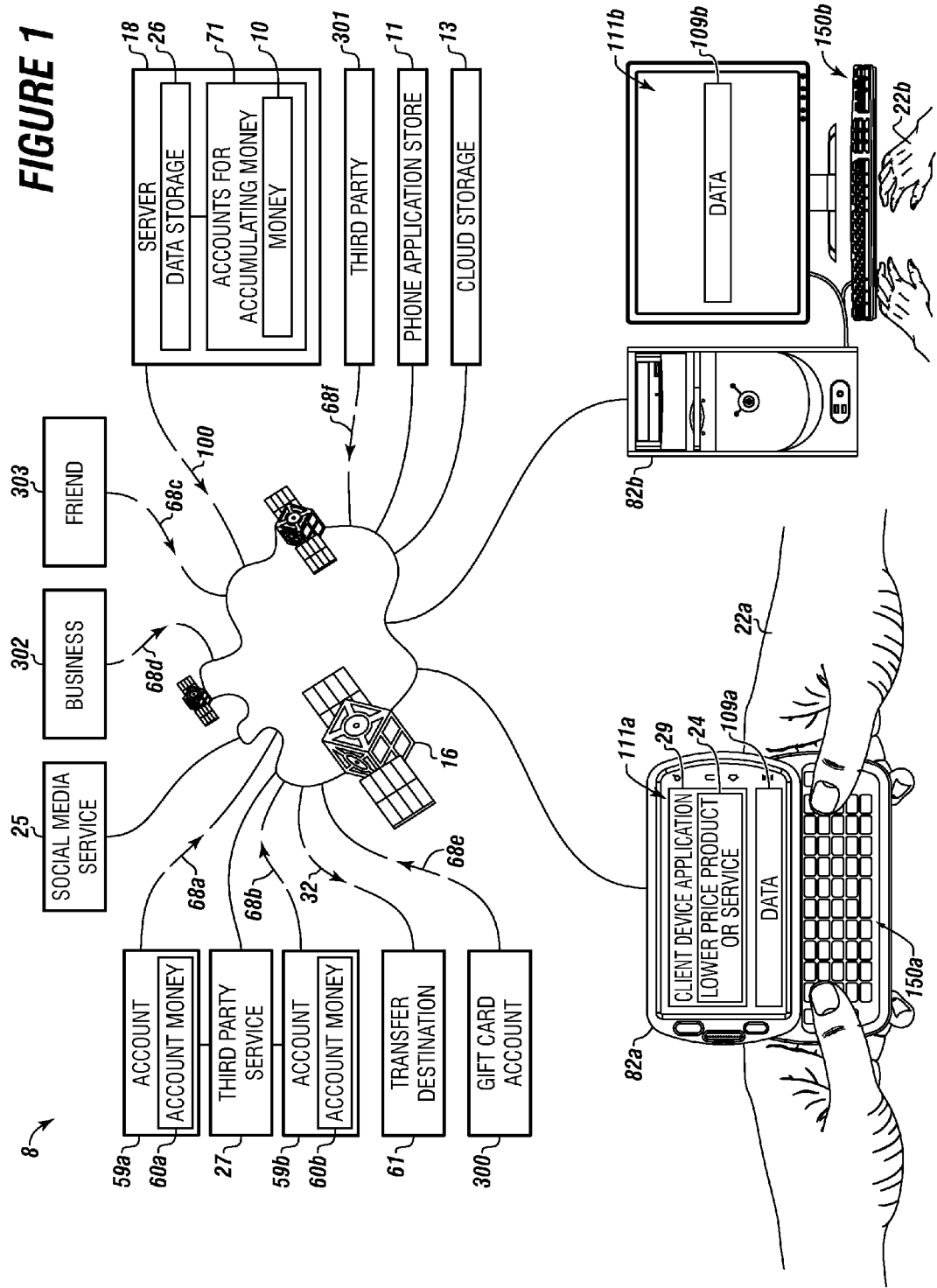

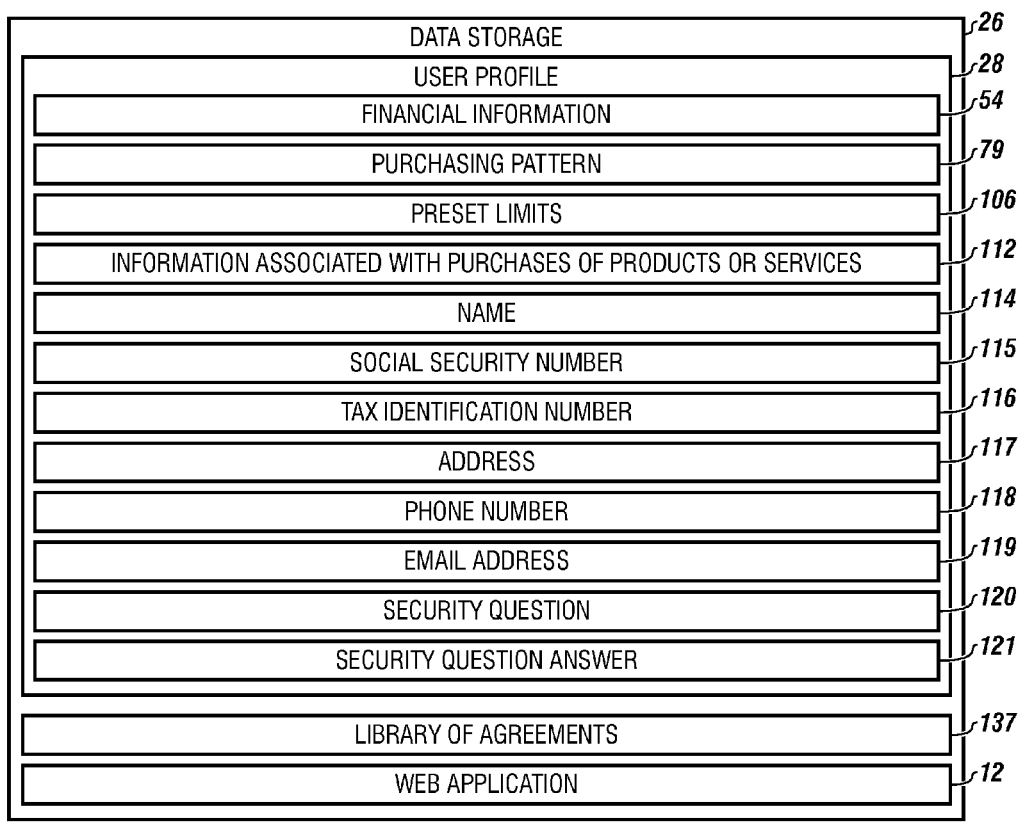

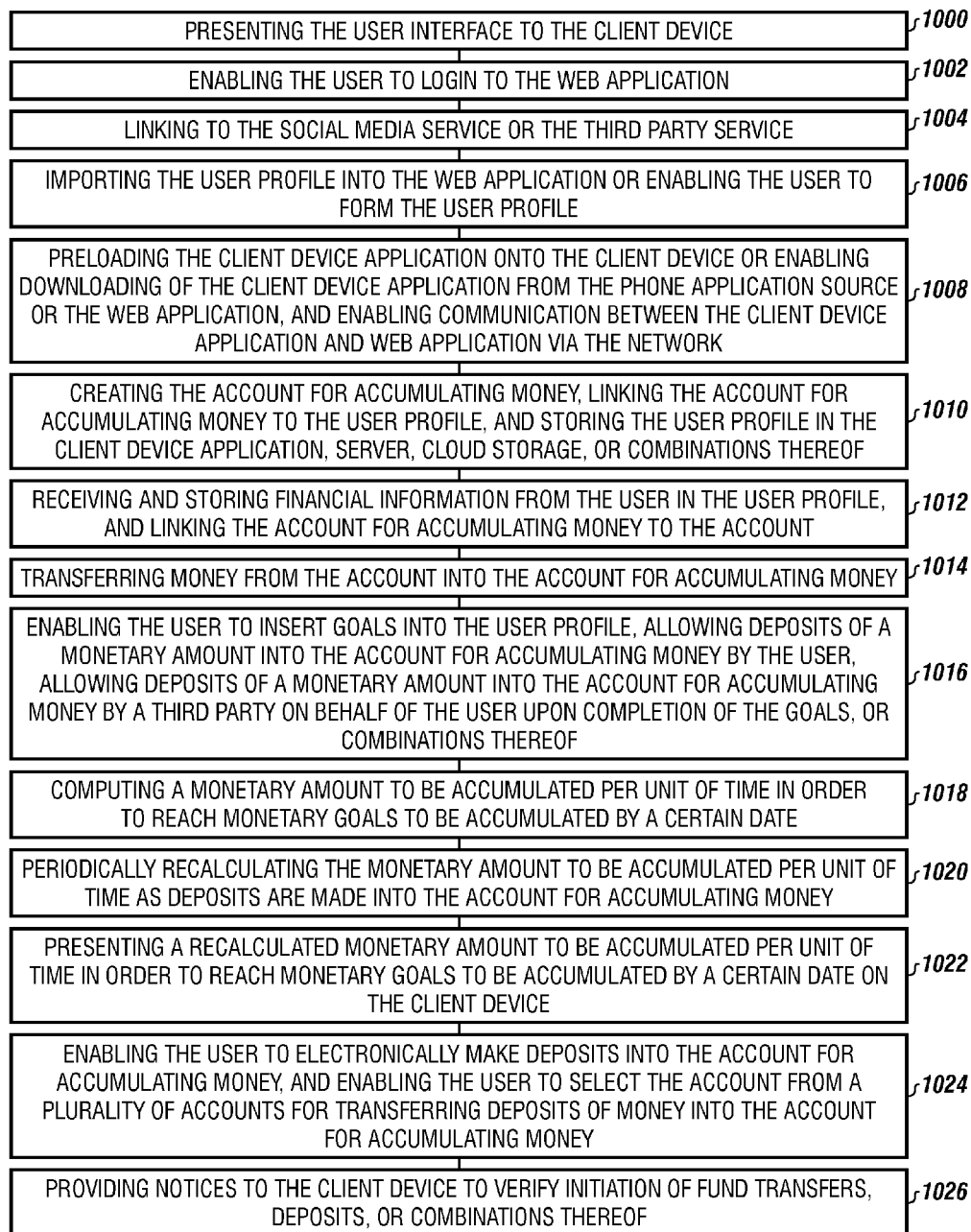

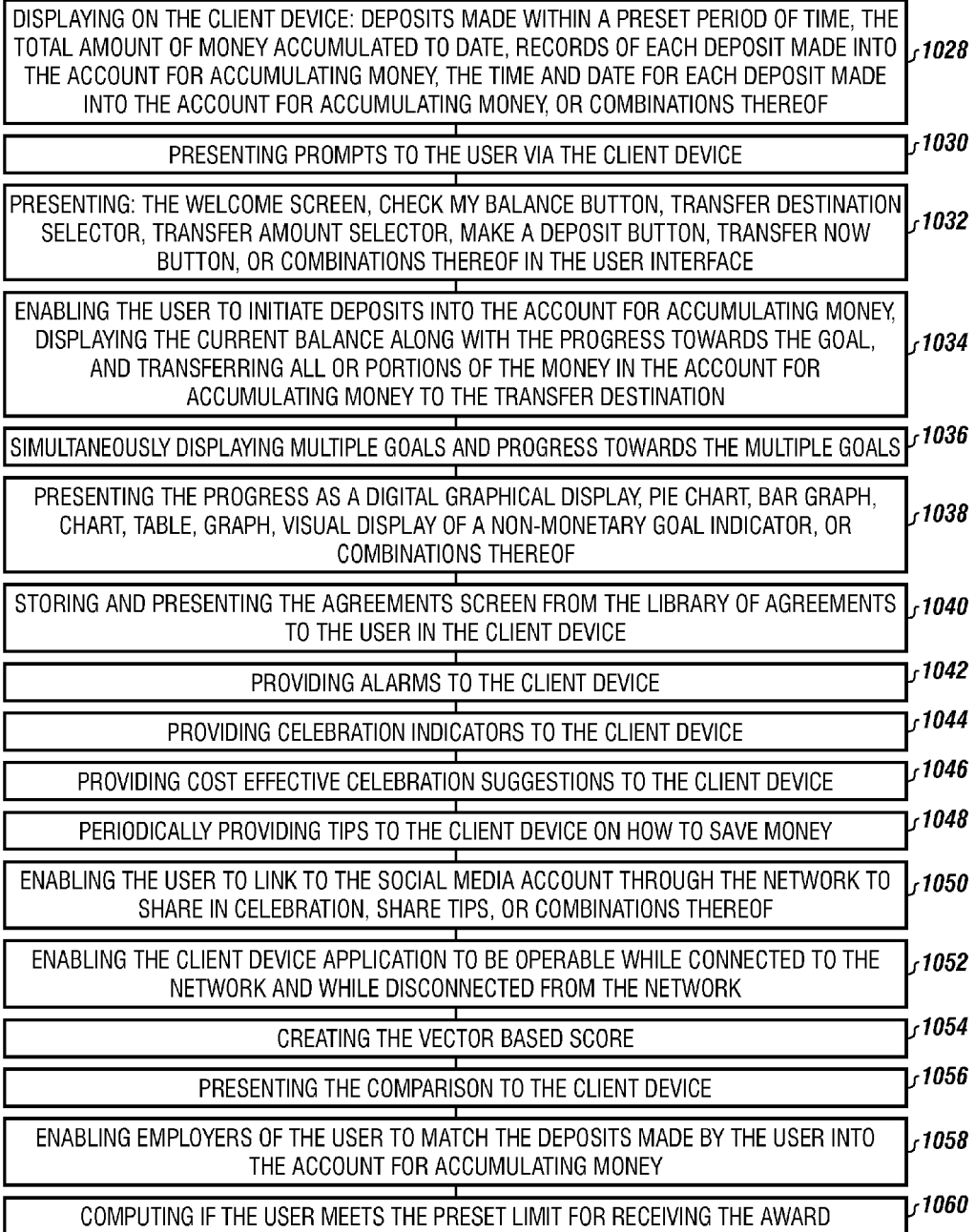

COMPUTER IMPLEMENTED METHOD FOR ACCUMULATING MONEY

CROSS REFERENCE TO RELATED APPLICATIONS

The present application claims priority to and the benefit of co-pending U.S. Provisional Patent Application Ser. No. 61/471,588 filed on Apr. 4, 2011, entitled "METHOD AND SYSTEM FOR INCREMENTAL ACCUMULATION OF MONEY TO PROMOTE SELF-EMPOWERMENT AND WEALTH ACCUMULATION." This reference is hereby incorporated in its entirety.

FIELD

The present embodiments generally relate to a computer implemented method for accumulating money.

BACKGROUND

A need exists for a computer implemented method for incremental accumulation of money that can promote self-empowerment and wealth accumulation.

A need exist for a computer implemented method for accumulating money that can enable people with limited knowledge of saving and capital management to create money accounts for investment, retirement, vacations, and other uses.

A need exists for a computer implemented method for accumulating money in small increments that enables users with limited capital to accumulate wealth for use in investments and purchasing expensive products or services.

The present embodiments meet these needs.

BRIEF DESCRIPTION OF THE DRAWINGS

The detailed description will be better understood in conjunction with the accompanying drawings as follows:

FIG. 1 depicts a system usable to implement the method according to one or more embodiments.

FIG. 7 depicts a data storage according to one or more embodiments.

FIGS. 9A-9C depict a diagram of the method according to one or more embodiments.

Figure 2A:
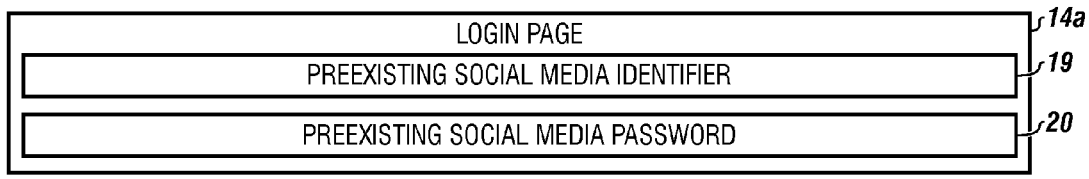
FIGS. 2A, 2B, and 2C depict login pages according to one or more embodiments.

The present embodiments are detailed below with reference to the listed Figures.

DETAILED DESCRIPTION OF THE EMBODIMENTS

Before explaining the present method in detail, it is to be understood that the method is not limited to the particular embodiments and can be practiced or carried out in various ways.

The present embodiments relate to a computer implemented method for accumulating money using a web application, such as the MYSTASH™ web application.

The computer implemented method can encourage incremental investment, promote self-empowerment, and increase wealth accumulation of users with a simple and easy to use web application.

The computer implemented method can enable users to view results of accumulations of money in real-time, such as by providing a display of progress towards a certain monetary amount to be saved. As such, the users can celebrate success as money is accumulated.

The monetary amount can be an amount of money, such as an amount in euros, dollars, another form of currency, or the like.

The computer implemented method can benefit the American economy as a whole, such as by increasing savings rates and a number of citizens that are financially self-sufficient.

The computer implemented method can be used to accumulate money using a client device in communication with a server through a network. The server can have numerous computer instructions stored therein to form the web application.

The client device can be a mobile phone, a smart phone, a computer, a tablet, a laptop computer, or another communication device.

The server with the web application can communicate with other servers over the network, such as social media service websites, financial service provider websites, third party websites, or the like.

The financial service providers can be brokers, banks, other institutions or businesses that provide accounts to store money that can be connected to over the network, or the like.

The social media service can include social networking websites, such as FACEBOOK®, micro-blogging websites, such as TWITTER®, or the like. The social media service can provide services including logging in with usernames and passwords and linking to friends over the network to enable communication with those friends in real-time by text or other digital media with or without GPS locating information.

The server can include a processor and a data storage.

The network can be a satellite network, a cellular network, the internet, a wireless network, a wired network, a phone line, any communications network, or combinations thereof.

In one or more embodiments, the computer implemented method can include enabling users to login to the web application using a preexisting social media identifier and preexisting social media password, such as a FACEBOOK® user name and password.

In embodiments, the computer implemented method can include enabling the users to login to the web application using a preexisting third party site identifier and preexisting third party password, such as a bank user name and password.

In operation, if the preexisting social media identifier and preexisting social media password or preexisting third party site identifier and preexisting third party password are used to login to the web application, computer instructions in the web application can enable the user to import a user profile from the preexisting social media service or third party service; thereby forming a user profile for the web application.

In embodiments, the user can create a unique login with a new user identifier and new password for use with the web application.

In embodiments, the user can access the web application on the server or access a client device application version of the web application using the client device. The client device application can be downloaded onto the client device from the web application, such as from a phone application store or another software supplier.

In embodiments, the client device application can contain computer instructions that enable the user with the client device to communicate with the web application via the network.

In operation, the client device application can enable creation of the user profile therein, downloading of the user profile from the social media service or third party service, or combinations thereof.

In one or more embodiments the client device application can be pre-loaded and stored in the client device, enabling the user to create login information using the client device application.

The client device application can enable the client device to communicate with the server through the network in real-time or perform operations offline and then connect to the server at a later time for updating the server.

In one or more embodiments the client device application can enable the client device to work offline without connecting to the server, connect to a financial institution that hosts an account for accumulating money, such as a MYSTASH™ account, and use an input device of the client device to provide funds to the account for accumulating money.

The web application and the client device application can both be configured to provide the client device with a user interface to access the web application, the account for accumulating money, and the server.

The user interface can include: a welcome screen, a make a deposit button, a check my balance button, a transfer destination selector, a transfer amount selector, a transfer my accumulations button, or combinations thereof. The user interface can enable the user to upload data to the server, download data from the server, and initiate transfers to and from the account for accumulating money.

The buttons of the user interface can actuate computer instructions in the server to enable the user to select the make a deposit button to initiate a deposit to the account for accumulating money; enable the user to select the check my balance button to view a current balance in the account for accumulating money while viewing a display of progress towards the monetary amount to be accumulated; enable the user to identify a transfer destination with the transfer destination selector and to input or select a transfer destination for receiving transfers of money from the account for accumulating money; enable the user to select the transfer my accumulation button to initiate a transfer of a monetary amount from the account for accumulating money to the transfer destination; or combinations thereof.

In one or more embodiments, the server can host the web application, and the user can use the client device to access the web application, such as through a website. The website can function as the user interface between the server and the user via the client device.

The computer implemented method can include creating and storing user information for the user into the user profile. In one or more embodiments, the user can be an individual, a group of individuals, a family, a business organization, a non-profit organization, or the like.

The computer implemented method can include creating and storing a user account number into the user profile, such as user account number 1234ABCD.

The user profile can also include a name of the user, a social security number of the user, a tax identification number of the user, an address of the user, a phone number of the user, an email address associated with the user, or combinations thereof.

The computer implemented method can include receiving and verifying a password from the user, and storing the password into the user profile.

The computer implemented method can include providing a security question to the user, and receiving and storing an answer to the security question into the user profile. For example, the server can present the security question on a display of the client device within the user interface, such as "What was the name of your first pet?" The user can utilize the user interface on the client device to transmit an answer to the question, such as "Fido." The server can require that any client device attempting to login to the user profile provide the user account number, an identifier, a password, the answer to the security question, or combinations thereof.

The computer implemented method can include creating the account for accumulating money and linking the account for accumulating money to the user profile. The account for accumulating money can also be linked to an account that the user controls, has access to, can deposit money within to save and accumulate, or the like.

The account for accumulating money can be an account at a financial institution, a part of a consolidated fund held by an administrator or a designated third party that is able to track funds in the account for accumulating money. The account for accumulating money can be a preexisting account of the user at a financial institution.

In one or more embodiments, each user can have a separate account for accumulating money.

In embodiments, all web application users can deposit money into a single account for accumulating money, with each user owning a portion of the money within the account for accumulating money contributed by that user. The user's money within the account for accumulating money can accrue interest.

The computer implemented method can include receiving and storing financial information associated with the user in the user profile related to at least one account and the account for accumulating money. The financial information can include account access information for the at least one account, an account number, a name of a host of the account, a login number, a login security code, a login password, or combinations thereof. The account can be a gift card, a debit card account, a bank account, or the like.

The computer implemented method can include linking the account for accumulating money to the account or to a plurality of accounts. The account for accumulating money can be configured to receive deposits from each account.

In operation, if the user has more than one account linked to the user's account for accumulating money, the user can select which of the accounts to transfer a particular deposit from. The server can present all of the accounts linked to the user's account for accumulating money, such as in a drop-down menu or the like, and can enable the user to select one of the accounts.

The deposits can be money from the account. For example, the user can make a deposit of $3.00 from the account into the account for accumulating money on a Monday because the user brought a lunch to work instead of eating out; thereby saving $3.00.

If the account is a gift card, the user can use an account number of the gift card to make a deposit into the account for accumulating money instead of purchasing items.

The account can be an account of a third party, such as employer account number that transfers money to the account for accumulating money when the user achieves a non-monetary goal, such as having no sick days during a month.

The account of the third party can transfer funds to the account for accumulating money when the user achieves a monetary goal, such as an extra $25 from the Small Business Administration, Social Security Administration, employer, or family member when the user saves $3000 in the account for accumulating money.

In embodiments, the account can be an account of a third party retail business, such as MACY'S®. The third party retail business can provide funds from a third party retail business account as an incentive to purchase, a rebate upon purchasing, or combination thereof. For example, the third party retail business can offer a deposit of $100 into the users account for accumulating money when the user buys a new 42 inch television.

The account can be an account of a friend, family, or other party related to the user; thereby enabling the friend, family, or other party to deposit money, such as for a birthday gift or an allowance.

The account can be an account at a financial institution, a savings account, a checking account, a debit account, a credit card account, a direct deposit account, another financial account eligible for transferring deposits into the account for accumulating money, a third party financial account, a gift card account, a bank account, a credit union account, a billing account, a phone bill account, a utilities account, or combinations thereof.

The account for accumulating money can be used to accumulate money to purchase items, services, attendance of events, other investments, accumulation of retirement funds, cars, houses, attendance of theme parks, attendance on cruise ships, vacations, or combinations thereof.

In embodiments, computer instructions in the web application can enable the user to select the account from a plurality of accounts for transferring a monetary amount into the account for accumulating money.

The computer instructions in the web application can enable the user to select the account from the plurality of accounts to request money from the account.

The computer instructions in the web application can enable the user to select the account from the plurality of accounts to provide a notice to the client device to verify initiation of each deposit. For example, the server can present a message on the user interface on the client device stating that "the deposit has been made."

The computer instructions in the web application can enable the user to select the account from the plurality of accounts to provide a display on the client device of: all deposits for a single day, all deposits for a preset period of time, a total amount accumulated to date, a record of each deposit made, a time and date for each deposit made into the account for accumulating money, other data stored in the server, or combinations thereof.

The computer implemented method can include enabling the user to input or select a goal into the user profile. The goal can be a monetary goal to accumulate money by a certain date, a non-monetary goal with a monetary amount associated with achieving the non-monetary goal, or combinations thereof.

For example, the goal can be a non-monetary goal to lose 10 pounds by Apr. 2, 2014. Once the non-monetary goal is met, the user or a third party can deposit a monetary amount associated with achieving the non-monetary goal into the account for accumulating money.

The goal can be investment, vacation, purchase of a product or service, attendance of an event, contribution to a charitable cause, or combinations thereof.

The user can select a combination of monetary and non-monetary goals. The goals and progress towards the monetary goal or monetary amounts associated with the non-monetary goals can be simultaneously presented to the client device using computer instructions in the web application.

The goals and progress towards the goals can be displayed as a digital graphical display, a pie chart, a bar graph, a chart, a table, a graph, a visual display of a non-monetary goal indicator, or combinations thereof.

In operation, the user can select and input a transfer destination to transfer accumulated money within the account for accumulating money to once the goal is achieved.

The transfer destination can be a financial service company, a bank account, a brokerage firm account, a mutual fund, an individual retirement account, a checking account, a savings account, an account with a precious metal broker, an account with a municipal bond broker, an account secured by treasury certificates, an account with a cruise line, an account with theme park, an account with a personal financial advisor, an account with a travel agency, an investment account, or combinations thereof.

The user can customize how much money is to be accumulated within the account for accumulating money daily, weekly, monthly, yearly, or in another increment of time. As such, the user can customize use of the web application in a manner that suits the user's income, expenses, and other variables.

The computer implemented method can be implemented in a customized fashion for each of a plurality of users. For example, a first user can accumulate money over a single year to go to a theme park, such as $1000.00; a second user can accumulate money over that same year to purchase a car, such as $15,000.00; a third user can accumulate money over that same year to contribute to a retirement fund, such as a $5,000.00 contribution to an individual retirement account (IRA); and so forth. Each user can view his or her daily accumulations and, through the social media service, view how other users are doing to achieve their goals. Utilizing the social media service can provide positive peer pressure that can help the users achieve their goals.

The computer implemented method can include computing a monetary amount to be accumulated per a unit of time in order to reach the monetary amount to be accumulated by the certain date, and periodically recalculating the monetary amount that needs to be accumulated per unit of time as deposits are made into the account for accumulating money while presenting a recalculated amount that needs to be accumulated per unit of time to the user on the client device.

For example, if $100 is to be accumulated in the account for accumulating money, computer instructions of the web application can compute a number of days from when the goal is set to a date that the $100 is to be accumulated by, and then automatically divide the $100 by the number of days.

In operation, the user can select days for making deposits, such as making deposits every other day rather than daily. As deposits are made into the account for accumulating money, the computer instructions can recalculate the amount of money needed to reach the goal and present the recalculated amount to the user on the client device or otherwise in the user interface to the web application.

The computer implemented method can include using computer instructions of the web application or client device application to calculate progress towards the monetary amount to be accumulated by comparing an amount of money within the account for accumulating money to the monetary amount to be accumulated by the certain date. The progress can be calculated as a percentage or the like.

The computer implemented method can include using computer instructions to transmit prompts to the user. The prompts can include instructions or suggestions to the user on how to accumulate money.

The prompts can include a prompt to avoid buying certain products or services, and to save an amount of money equivalent to the product or service not purchased into the account for accumulating money.

One or more prompts can encourage the user to buy a lower priced product or service as a substitute for a higher priced product or service, and then to save an amount of money equivalent to the difference between the higher price and the lower price into the account for accumulating money.

For example, one or more prompts can encourage the user to replace a $15 entrée with a $10 entrée. One or more prompts can provide a suggestion to buy a soda rather than wine, which is higher in cost, or to drink tap water, which is free.

One or more prompts can be bill paying prompts to suggest to the user ways to save an amount of money while paying bills, such as by depositing $5.00 into the account for accumulating money while paying a power bill.

The bill paying prompts can remind the user to initiate a transfer of a saved amount of money related to an avoided late fee or finance charge associated with timely paying a bill into the account for accumulating money.

The bill paying prompts can include prompts to pay a bill before a due date; thereby raising the user's credit score.

The bill paying prompts can suggest stopping purchase of products or services that are not being utilized or fully utilized.

The bill paying prompts can suggest the user consider a lower cost alternative associated with the bill, such as a cheaper rate plan, a reduction in services, or a similar change to make an overall cost of the bill lower.

One or more prompts can be used to remind the user to consume food and beverages at home rather than at a restaurant, such as brewing coffee at home rather than purchasing the coffee at a retail coffee shop.

One or more prompts can suggest depositing windfalls, such as tax refund checks, into the account for accumulating money.

In operation, if the user follows the instructions or suggestions of the prompts, the user can be motivated to initiate a transfer of the amount of money as a deposit into the account for accumulating money. As such, the prompts can help ensure that the user stays on track to accumulate the monetary amount to be accumulated by the certain date.

In one or more embodiments, the computer implemented method can be used to provide prompts to users to educate the users on how to have a healthy diet at a lower price, such as by suggesting healthy but low priced menu items and grocery items.

The computer implemented method can include using computer instructions to enable the user to use one or more client devices to remotely make deposits into the account for accumulating money by transferring the deposits from the account into the account for accumulating money using client device while disposed remote from the account and from the account for accumulating money.

The computer implemented method can include determining the progress towards the monetary amount to be accumulated by comparing an amount of money accumulated within the account for accumulating money to the monetary amount to be accumulated by the certain date, and displaying the progress towards the monetary amount to be accumulated on the client device.

For example, the server can determine a numerical difference between the amount of money saved within the account for accumulating money and the monetary amount to be saved to perform the comparison. The comparison can also include a determination of a percent difference between the amount of money saved within the account for accumulating money and the monetary the amount to be saved.

The computer implemented method can include providing an updated monetary amount to be accumulated by the certain date to the client device.

In operation, the server can determine a number of days from the current day until the certain date. The server can divide the monetary amount to be saved by the determined number of days; thereby computing the amount that needs to be saved per day, which can be linked to the monetary amount to be saved and the certain date. As the server receives deposits into the account for accumulating money, the server can determine what the remainder of the monetary amount to be saved is for presentation to the user.

The computer implemented method can include enabling the user to choose a source of funds to be used to transfer the deposits from, enabling the user to request the deposits to be transferred from the source of funds, and providing a notice to the client device to verify initiation of each deposit.

The computer implemented method can include providing a library of agreements and enabling users, financial institutions, employers, and third parties to agree to at least one of the agreements in the library of agreements.

For example, the user can agree to a first agreement that enables the server to link the account for accumulating money to the at least one account.

A financial institution operating the at least one account can agree to a second agreement that enables the server to link the account for accumulating money to the at least one account.

An employer of the user can agree to a third agreement that enables the server to link a direct deposit service to the account for accumulating money.

A third party can agree to a fourth agreement that enables the server to link the account for accumulating money to a third party account for transferring deposits from the third party account to the account for accumulating money.

The computer implemented method can include providing alarms to the client device, such as when the server has not received deposits into the account for accumulating money sufficient to accumulate the monetary amount to be accumulated by the certain date.

The computer implemented method can include providing celebration indicators to the client device when the user achieves certain milestones towards monetary amount to be accumulated, and providing cost effective celebration suggestions to the client device.

The computer implemented method can include using the server to provide tips to the client device on how to accumulate additional money. The tips can be suggestions, such as a suggestion to cook a meal at home with a recipe for the meal. For example, a tip can include a recipe for a low cost bean soup. The tips can be provided as prompts. For example, the server can transmit a message to the client device that states "car pool with a co-worker to save money on fuel costs."

The computer implemented method can include enabling the user to link to a social media service through the network to share in celebration of accumulating the monetary amount to be accumulated, and share tips on where and how to accumulate money. For example, the social media service can be a third party social networking website, a social networking site hosted on the server, or another social networking site.

The computer implemented method can include enabling the user to request a comparison of the user's progress towards the monetary amount to be accumulated with other users' progress towards similar monetary amounts to be accumulated, and presenting the comparison to the client device.

The computer implemented method can include enabling an employer of the user to match deposits made by the user by providing direct deposits into the account for accumulating money, and providing an additional deposit of a preset amount of money each time the user is issued a payroll compensation using the direct deposit. As such, employers can utilize the computer implemented method to provide an additional benefit to their employees. Also, employers can track which employees are better at accumulating money, which can be an indication that the employee is capable of achieving their goals.

The computer implemented method can include providing an award to the user based on the progress towards the monetary amount to be accumulated and a rate of the progress towards the monetary amount to be accumulated.

The computer implemented method can include enabling a third party to make offers to the user, such as discounts, benefits, or combinations thereof for spending the monetary amount to be accumulated with the third party. The third party can be a theme park, a cruise ship company, a travel agency, a retail company, a precious metals company, a membership based organization, or another commercial entity.

One or more embodiments of the computer implemented method can include tracking purchases of the user, and providing the user with prompts to accumulate money based on the user's purchases.

For example, the computer implemented method can include linking a debit card account, a credit card account, or combinations thereof to the user profile and the account for accumulating money. Information associated with purchases of products or services made by the user using the debit card account, credit card account, or combinations thereof can be transmitted to the server for tracking the user's purchases of products or services.

The computer implemented method can include tracking the user's purchases of products or services by: receiving and storing information related to the user's purchases of products or services from the debit card account, credit card account, or combinations thereof, and using the information related to the user's purchases of products or services to form a purchasing pattern. The purchasing pattern can be saved in the user profile and presented to the client device. The server can tabulate information related to the user's purchases of products or services to form the purchasing pattern.

The computer implemented method can include comparing current purchases of products or services made using the debit card account, credit card account, or combinations thereof to previous purchases of products or services in the purchasing pattern using a preset window of time to perform the comparison. The preset window of time can be one month, one week, one day, or any period of time. For example, the server can compare the amount of money that the user spends on groceries in a previous month stored within the purchasing pattern to the amount of money that the user spends on groceries in the current month.

The computer implemented method can include computing an amount of money saved by the user by not purchasing a product or service that the user previously purchased, and presenting the amount of money saved to the client device. For example, if the user's purchasing pattern indicates that the user purchases ten sodas every month, and the user's current purchases indicate that the user did not purchase any sodas for that month, the server can compute the amount of money that the user saved by not purchasing the ten sodas. The server can send a prompt to the user suggesting that the user transfer the amount of money saved by not purchasing the ten sodas into the account for accumulating money.

The computer implemented method can include computing an amount of money saved by the user by purchasing a lower priced product or service than a related product or service within the purchasing pattern, and presenting the amount of money saved to the client device. For example, if the user's purchasing pattern indicates that the user purchases ten sodas every month, and the user's current purchases indicate that the user purchased ten cheaper sodas for that month or purchased only five sodas that month, then the server can compute the amount of money that the user saved by purchasing the ten cheaper sodas or five sodas. The server can send a prompt to the user suggesting that the user transfer the amount of money saved by purchasing the ten cheaper sodas or five sodas into the account for accumulating money.

The computer implemented method can include enabling the user to initiate a transfer of a deposit equivalent to the amount of money saved into the account for accumulating money. As such, the user can see the amount of money saved and make a decision of whether or not to transfer the money saved into the account for accumulating money.

The computer implemented method can include providing an additional deposit of a preset amount of money each time the debit card account, credit card account, or combinations thereof is used to purchase products or services.

In operation, the user can download the software of the web application or client device application onto the client device. The software can be hosted on the server, and can present the user interface to the client device.

The user can choose to sign up for an account and form the user profile associated with the account for accumulating money. Once the user profile is formed, the user can login to the user profile with a password and other information to link the at least one account to the account for accumulating money and view a balance of the account for accumulating money.

The user can also view the tips, prompts, alarms, and other such data within the server by logging in to the user profile.

The user can initiate transfers of deposits from the at least one account to the account for accumulating money. The user can also periodically transfer at least a portion of the accumulated money from the account for accumulating money to another account, such as an investment account or another transfer destination.

The user can select or input a certain goal associated with accumulating money in the account for accumulating money, such as a goal of going on a particular vacation. In one or more embodiments, the user can participate with a group of other users to achieve a single goal. For example, swim team members can accumulate money in the account for accumulating money in order to attend a swimming event.

The user can input or select the monetary amount to be accumulated associated with the goal along with the date and time when that goal is to be achieved. The user interface can then present to the user the amount that needs to be accumulated per day in order to reach the goal.

In one or more embodiments, the user can select buttons in the user interface, such as a tips button, which can cause the user interface to present information from the server to the client device, such as tips on how to accumulate money. The tips within the server can be searchable by the user using the user interface.

Turning now to the figures, FIG. 1 depicts a system that can be used to implement the computer implemented method according to one or more embodiments.

The system 8 can include client devices 82a and 82b in communication with a server 18 through a network 16.

The server 18 can have a data storage 26 containing computer instructions of the web application and client device application 29.

The server 18 can also host one or more accounts for accumulating money 71, which can be linked to the data storage 26. The accounts for accumulating money 71 can have money 10 saved therein.

One or more accounts, such as accounts 59a and 59b, each having account money 60a and 60b, can be linked to the accounts for accumulating money 71, the client devices 82a and 82b, or combinations thereof through the network 16.

In operation, the accounts for accumulating money 71 can be configured to receive deposits 68a and 68b from the accounts 59a and 59b.

The accounts 59a and 59b can be accounts at a financial institution, savings accounts, checking accounts, debit accounts, credit card accounts, direct deposit accounts, other financial accounts eligible for transferring the deposits, bank accounts, credit union accounts, billing accounts, phone bill accounts, utilities accounts, third party financial accounts, such as ITUNES® accounts, gift card accounts, or PAYPAL® accounts, or combinations thereof.

A third party service 27, such as a third party financial institution, can be in communication with the network 16 and linked to the accounts 59a and 59b, the accounts for accumulating money 71, the client devices 82a and 82b, the server 18, or combinations thereof for supporting the accounts 59a and 59b.

A social media service 25 can be in communication with the network 16 and linked to the accounts 59a and 59b, the accounts for accumulating money 71, the client devices 82a and 82b, the server 18, or combinations thereof for communication with the web application, such as by using a social media service identifier.

A phone application store 11, such as ITUNES®, can be in communication with the network 16 and linked to the accounts 59a and 59b, the accounts for accumulating money 71, the client devices 82a and 82b, the server 18, or combinations thereof for storing the client device application 29 onto the client devices 82a and 82b and allowing users 22a and 22b to download the client device application 29 to the client devices 82a and 82b.

A cloud storage 13 can be in communication with the network 16 and linked to the accounts 59a and 59b, the accounts for accumulating money 71, the client devices 82a and 82b, the server 18, or combinations thereof for storing information related to the user profile, the accounts for accumulating money 71, the accounts 59a and 59b, and other information. The cloud storage 13 can be used in place of the data storage 26 or in combination with the data storage 26.

A friend 303 can be in communication with the network 16 and linked to the accounts 59a and 59b, the accounts for accumulating money 71, the client devices 82a and 82b, the server 18, or combinations thereof; thereby allowing the friend 303 to transmit deposits 68c of funds to the accounts for accumulating money 71, such as for wedding gifts. The friend 303 can communicate through the network 16 via a computer, mobile phone, or the like.

A business 302, such as a retailer, can be in communication with the network 16 and linked to the accounts 59a and 59b, the accounts for accumulating money 71, the client devices 82a and 82b, the server 18, or combinations thereof for providing rebates or incentives to the users 22a and 22b, such as deposits 68d. The deposits 68d can be transmitted to the accounts for accumulating money 71, such as after the users 22a and 22b purchase a product or service from the business 302.

In operation, the business 302 can operate an account linked to the accounts for accumulating money 71 for providing the deposits 68d. For example, the business 302 can be a grocery store that can offer the deposits 68d in order to attract business, such as a deposit of 5 percent of a customer's bill into the accounts for accumulating money 71.

One or more gift card accounts 300 can be in communication with the network 16 and linked to the accounts 59a and 59b, the accounts for accumulating money 71, the client devices 82a and 82b, the server 18, or combinations thereof, and can be used to make deposits 68e into the accounts for accumulating money 71.

A third party 301 can be in communication with the network 16 and linked to the accounts 59a and 59b, the accounts for accumulating money 71, the client devices 82a and 82b, the server 18, or combinations thereof for providing deposits 68f of funds into the accounts for accumulating money 71. The third party 301 can be a government agency or bureau, such as the Social Security Administration, a health organization, or another third party.

The third party 301 can provide the deposits 68f based upon particular products or services purchased by the users 22a and 22b. For example, the third party 301 can offer certain deposit amounts associated with certain products or services.

The third party 301 can provide the users 22a and 22b with offers. The offers can be discounts, benefits, or combinations thereof for spending the monetary amount to be accumulated with the third party 301. For example, a theme park can offer discounts or other benefits to the users 22a and 22b for accumulating money in the accounts for accumulating money 71 for a trip to the theme park. The third party 301 can be a theme park, a cruise ship company, a retail store, a travel agency, or any other third party.

In one or more embodiments, the third party 301 can be an employer of one or more of the users 22a and 22b, and can transfer direct deposits into the accounts for accumulating money 71 using a direct deposit service. The employer can provide additional deposits of preset amounts of money each time the employer issues the users 22a and 22b payroll compensation.

For example, if the users 22a and 22b have met certain goals during a pay period, when the employer issues a payroll compensation for the users 22a and 22b the employer can also issue a direct deposit into the accounts for accumulating money 71. The amount that the employer deposits into the accounts for accumulating money 71 can be determined by the employer, such as a matching contribution, a percentage of payroll compensation, a percentage of the user's 22a and 22b contributions to the accounts for accumulating money 71, or a predetermined amount of money.

The server 18 can transmit prompts 100 to the client devices 82a and 82b for presentation to the users 22a and 22b in user interfaces 111a and 111b on the client devices 82a and 82b.

In one or more embodiments, the prompts 100 can include a prompt to not buy a product or service to accumulate an amount of money, and if the users 22a and 22b do not buy the product or service, the server 18 can enable the users 22a and 22b to initiate a transfer the amount of money into the accounts for accumulating money 71.

For example, the prompts 100 can cause the client device application 29 presented in the user interface 111a to prompt the users 22a to buy a lower priced product or service 24 as a substitute for a higher priced product or service for accumulating an amount of money. In operation, if the user 22a purchases the lower priced product or service 24, the server 18 can enable the user 22a to initiate a transfer the saved amount of money into the accounts for accumulating money 71.

The prompts 100 can include a pre-lunchtime prompt, a pre-dinner prompt, a coffee break prompt, or the like, which can suggest to the users 22a and 22b to buy a lower cost lunch, dinner, or coffee break products or services and accumulate an amount of money. In operation, if the users 22a and 22b purchase the lower cost lunch, dinner, or coffee break products or services, the server 18 can enable the users 22a and 22b to initiate a transfer the saved amount of money into the accounts for accumulating money 71.

The prompts 100 can suggest that the users 22a and 22b drink water for free rather than purchasing a soda. The users 22a and 22b can then transfer saved money that is equivalent to the cost of the soda into the accounts for accumulating money 71.

The prompts 100 can include a supermarket prompt to buy lower cost supermarket products or services and accumulate an amount of money. In operation, if the users 22a and 22b purchase the lower cost supermarket products or services, computer instructions in the server 18 can enable the users 22a and 22b to initiate a transfer the amount of money saved into the accounts for accumulating money 71. For example, the server 18 can suggest purchasing beans or another high protein, low fat, and low cost product instead of a higher priced item, such as sushi or steaks, and can compute the money saved and encourage the users 22a and 22b to deposit the money saved into the accounts for accumulating money 71.

The prompts 100 can include bill paying prompts to save and/or accumulate an amount of money.

For example, the bill paying prompts can prompt the users 22a and 22b to consider a lower cost phone plan or other utility plan, prompt the users 22a and 22b to pay a bill before a due date, prompt the users 22a and 22b to cease purchasing products or services not being used, prompt the users 22a and 22b to consider a lower cost alternative associated with a bill, or the like.

The prompts 100 can suggest to the users 22a and 22b to discontinue purchasing gym memberships not being used, movie channels services or other television related services not being used, or insurance premiums that are no longer needed.

The server 18 can present the user interfaces 111a and 111b to the users 22a and 22b, such as on a display associated with the client devices 82a and 82b. The user interfaces 111a and 111b can present data 109a and 109b from the server 18, cloud storage 13, accounts for accumulating money 71, accounts 59a and 59b, or combinations thereof for the users 22a and 22b to view.

The data 109a and 109b can include: results, the progress towards the monetary amount to be accumulated, a notice to verify initiation of each deposit, all deposits for a single day, a total amount accumulated to date, a record of each deposit made, a time and date for each deposit made, an alarm, an award, a comparison of the user's progress towards the monetary amount to be accumulated with other users' progress towards similar monetary amounts to be accumulated, tips, cost effective celebration suggestions, celebration indicators, social media, a vector based score, goal information, progress information, deposit information, a rate of progress towards goals, information associated with purchases of products or services, a purchasing pattern, the user profile, and any other data saved within the server 18, cloud storage 13, or combinations thereof.

A transfer destination 61 can be in communication with the network 16 and linked to the accounts 59a and 59b, the accounts for accumulating money 71, the client devices 82a and 82b, the server 18, or combinations thereof for receiving fund transfers 32 from the accounts for accumulating money 71.

The transfer destination 61 can be an account with a financial service company, a bank account, a brokerage firm account, a mutual fund, an individual retirement account, a checking account, a savings account, an account with a precious metal broker, an account with a municipal bond broker, an account secured by treasury certificates, an account with a cruise line, an account with theme park, an account with a personal financial advisor, an account with a travel agency, an investment account, or combinations thereof.

In operation, the users 22a and 22b can use the input devices 150a and 150b of the client devices 82a and 82b to operate the client device application 29 or web application within the user interfaces 111a and 111b for communication with the server 18, accounts for accumulating money 71, accounts 59a and 59b, and transfer destination 61.

Figure 2B:
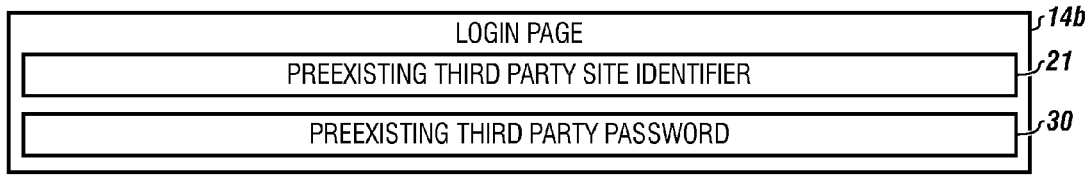
Figure 2C:
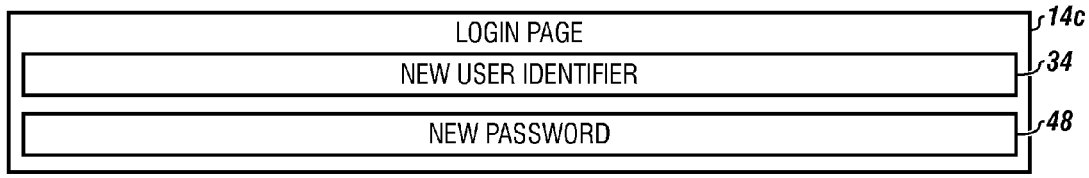

FIGS. 2A, 2B, and 2C depict embodiments of a login page of the web application for allowing users to login to the web application using client devices.

The login page 14a can allow the users to login to the web application using a preexisting social media identifier 19 and a preexisting social media password 20.

The login page 14b can allow the users to login to the web application using a preexisting third party site identifier 21 and a preexisting third party password 30.

The login page 14c can allow the users to login to the web application using a new user identifier 34 and a new password 48.

Figure 3:
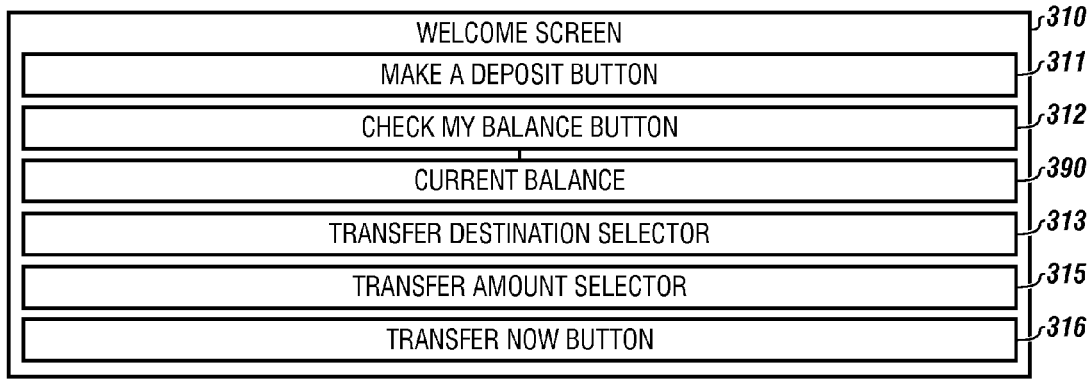
FIG. 3 depicts a welcome screen according to one or more embodiments.

FIG. 3 depicts a welcome screen that can be presented to users that have logged in to the web application.

The welcome screen 310 can include a make a deposit button 311, allowing the users to make deposits into the accounts for accumulating money.

The welcome screen 310 can include check my balance button 312, allowing users to view a current balance 390 in the client devices.

The welcome screen 310 can include a transfer destination selector 313, allowing users to select a destination for a transfer of funds from the accounts for accumulating money.

The welcome screen 310 can include a transfer amount selector 315, allowing users to select an amount of funds from the accounts for accumulating money to be transferred.

The welcome screen 310 can include a transfer now button 316, allowing users to initiate transfer of funds from the accounts for accumulating money.

The buttons and selectors in the welcome screen 310 can enable the users to transmit information and commands to the server to actuate the computer instructions therein. As such, in operation, when the users use the buttons or selectors in the welcome screen 310, the client device can activate computer instructions in the server to perform associated actions, such as initiation of a transfer of funds.

The buttons and selectors can be touch screen buttons presented by the user interface or other buttons on the client device.

Figure 4:
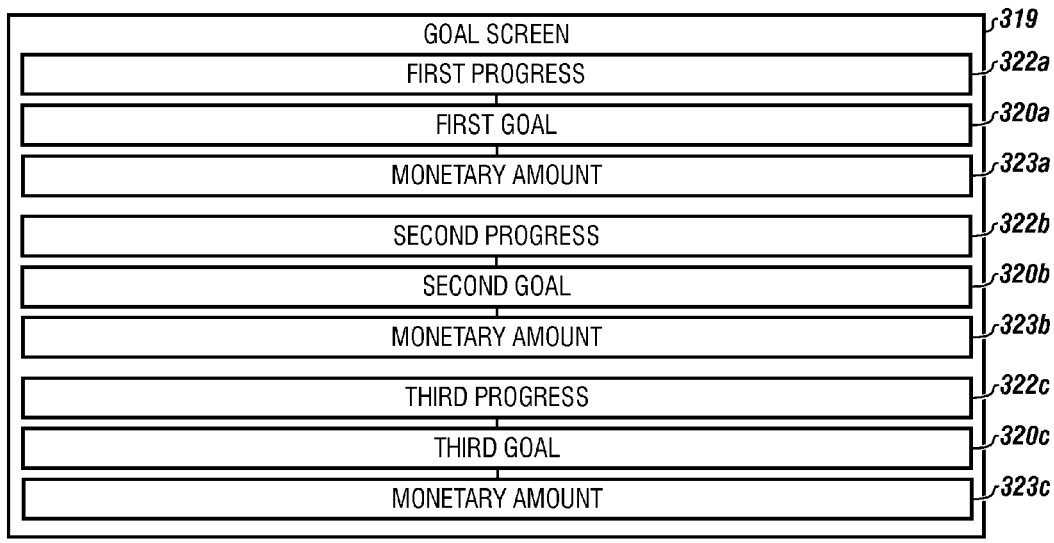
FIG. 4 depicts a goals screen according to one or more embodiments.

FIG. 4 depicts a goal screen that can be presented to users that have logged in to the web application.

The goal screen 319 can be presented in the user interface on the client devices.

The goal screen 319 can customizable, allowing the users to input custom goals and track progress towards the goals.

For example, the goal screen 319 can present a first goal 320a, such as a non-monetary goal to lose 20 pounds within 1 year. The goal screen 319 can also present a first progress 322a towards the first goal 320a. For example, the first progress 322a can indicate that the associated user has lost 5 pounds and has achieved 25 percent of the first goal 320a.

The goal screen 319 can present a second goal 320b, such as a non-monetary goal to learn how to play ice hockey within 2 years by taking 20 lessons. The goal screen 319 can also present a second progress 322b towards the second goal 320b. For example, the second progress 322b can indicate that the associated user taken 15 lessons and has achieved 75 percent of the second goal 320b.

The first goal 320a and second goal 320b can each have monetary amounts 323a and 323b associated therewith. The monetary amounts 323a and 323b can be amounts of money that will be deposited into the associated user's account for accumulating money upon 100 percent achievement of the first goal 320a and the second goal 320b respectively.

The goal screen 319 can present a third goal 320c to save a monetary amount 323c, such as a monetary goal to save $1000 within 1 year. The goal screen 319 can also present a third progress 322c towards the third goal 320c. For example, the third progress 322c can indicate that the associated user saved $850 and has achieved 85 percent of the third goal 320c.

In one or more embodiments, the progress 322a-322c can be presented as digital graphical displays, pie charts, bar graphs, charts, tables, graphs, visual displays of non-monetary goal indicators, or combinations thereof.

Figure 5:
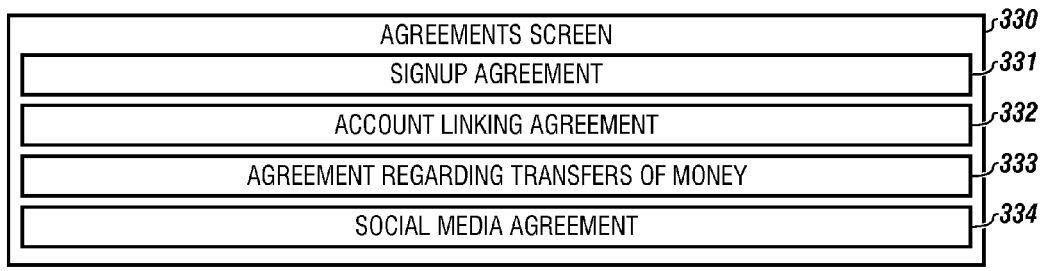
FIG. 5 depicts an agreements screen according to one or more embodiments.

FIG. 5 depicts an agreements screen that can be presented to users that have logged in to the web application.

The agreements screen 330 can be presented in the user interface on the client devices.

The agreements screen 330 can present various agreements from a library of agreements in the server.

The agreements screen 330 can present a signup agreement 331, allowing the user to obtain a license to use the web application.

The agreements screen 330 can present an account linking agreement 332 that links a financial institution, a third party, or combinations thereof to the account for accumulating money to enable the web application to operate.

The agreements screen 330 can present an agreement regarding transfers of money 333, allowing for transfers of money into and out of the accounts for accumulating money. In one or more embodiments, the agreement regarding transfers of money 333 can be an employer-employee agreement that enables a direct deposit service to deposit money into the account for accumulating money.

The agreements screen 330 can present and a social media agreement 334 that links the social media service to the web application and the account for accumulating money.

In operation, the users, financial institutions, third parties, social media services, employers, the like, or combinations thereof can sign one or more of the agreements from the library of agreements for use of the web application.

Figure 6:
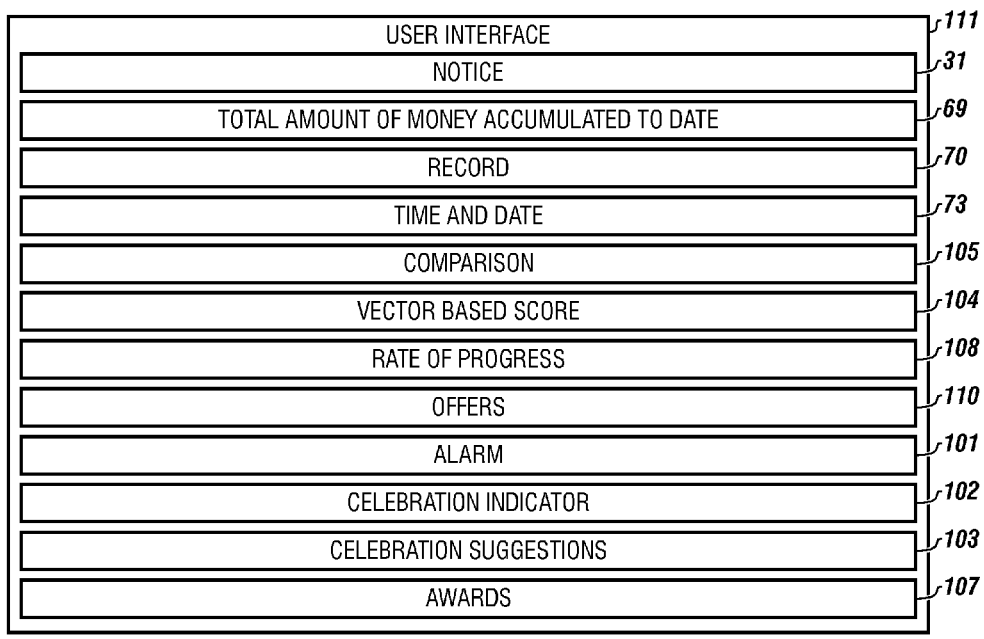
FIG. 6 depicts a user interface according to one or more embodiments.
Figure 8A:
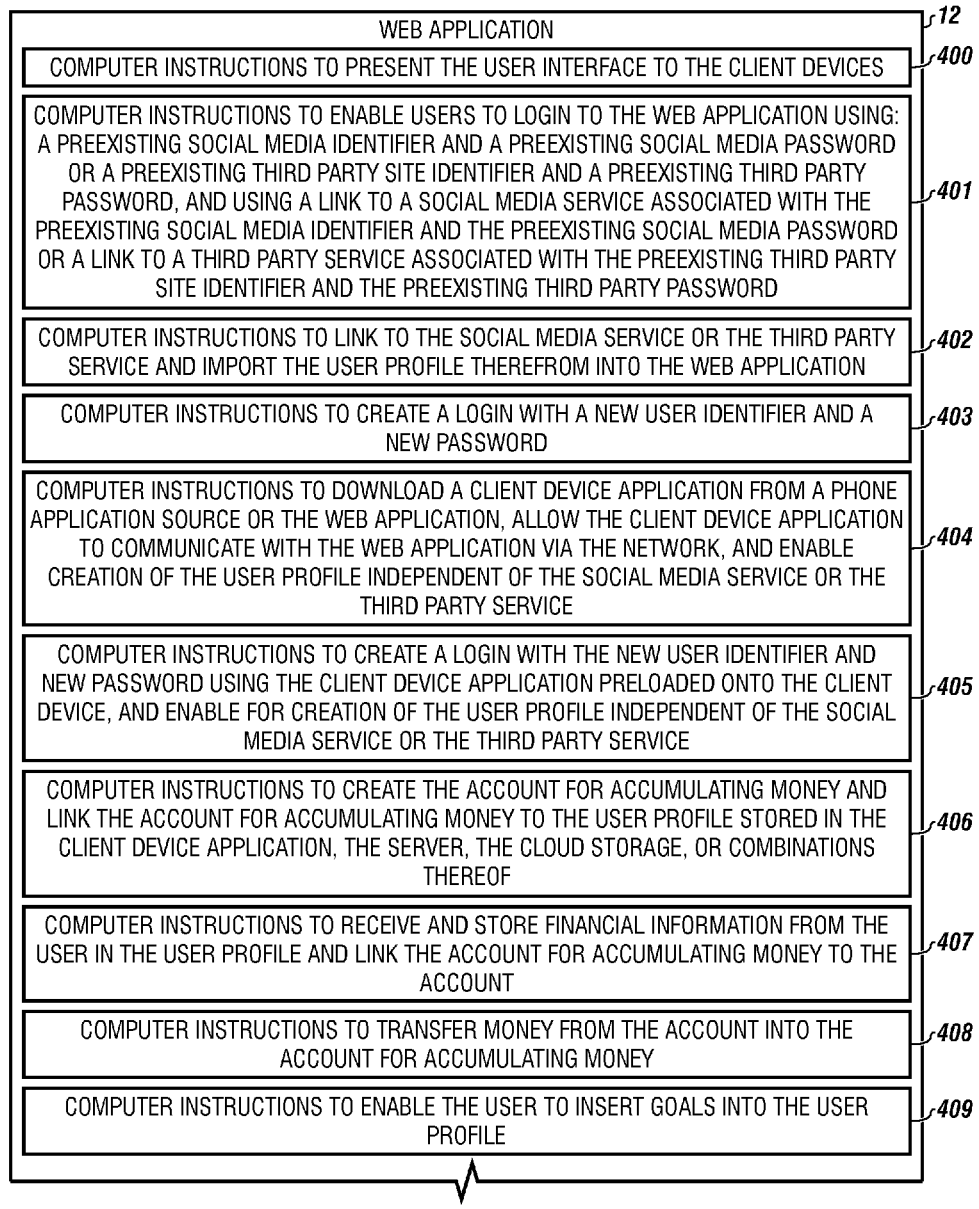
FIGS. 8A-8D depict computer instructions of a web application according to one or more embodiments.
Figure 8B:
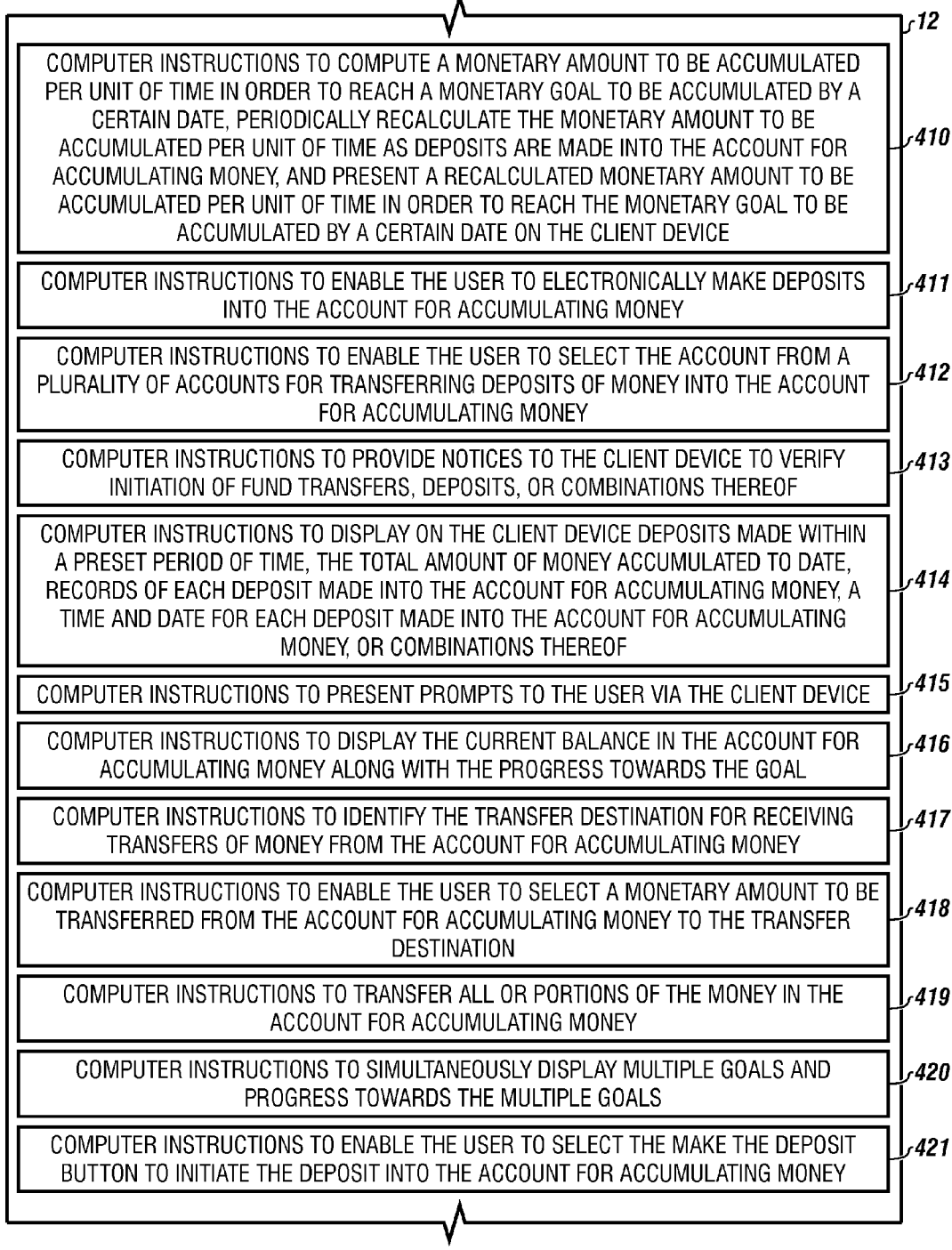
Figure 8C:
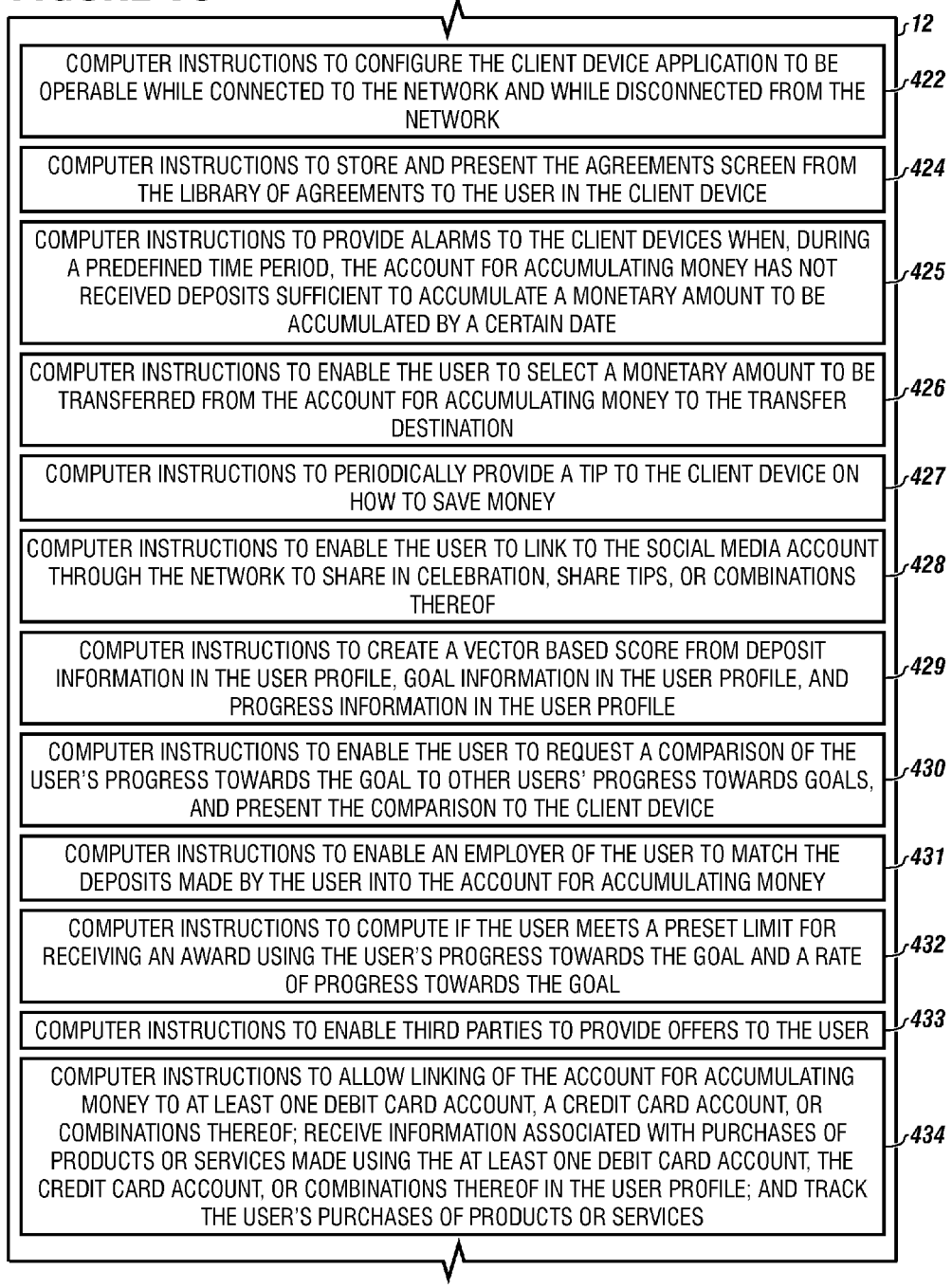
Figure 8D:
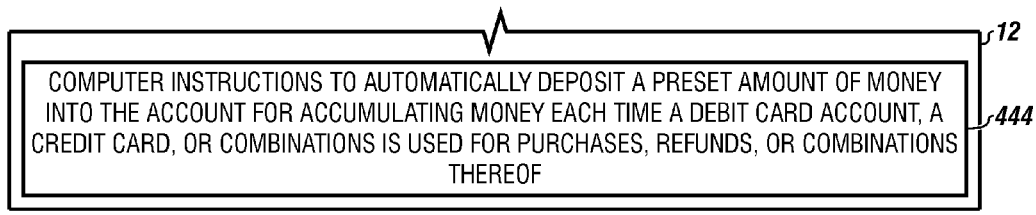

FIG. 6 depicts the user interface presented in the client device according to one or more embodiments.

The user interface 111 can be presented in the client device for presentation of various portions of information to the users, allowing the users to interact with the web application for accumulation of money.

The user interface 111 can present a notice 31 to verify initiation of fund transfers, deposits, or both.

The user interface 111 can present a total amount of money accumulated to date 69 for the associated user, a record 70 of each deposit made into the account for accumulating money, a time and date 73 for each deposit made into the account for accumulating money, a comparison 105 of the user's progress towards the goal to other user's progress towards the goal, a vector based score 104 that ranks the user relative to other users, a rate of progress 108, and offers 110 from third parties.

The user interface 111 can also present an alarm 101, such as when, during a predefined time period, the account for accumulating money has not received deposits sufficient to accumulate a monetary amount to be accumulated by a certain date. For example, if the user is not making deposits at a computed amount that needs to be saved per day, the server can send an audio alarm, visual alarm, or both to the client device in the user interface 111.

The user interface 111 can also present a celebration indicator 102 and celebration suggestions 103 when the user achieves a goal or makes progress towards achieving a goal. For example, if the user reaches the halfway point of accumulating the monetary amount to be saved, the server can transmit the celebration indicator 102 to the client device in the user interface 111 to congratulate and encourage the user.

The celebration indicator 102 can be animated graphical display, words of praise, words of support, an audio indicator, a visual indicator, a textual indicator, or combinations thereof.

The celebration suggestions 103, which can be cost effective celebration suggestions, can be coupons for products or services, instructions on how to receive promotional items, or combinations thereof.

The user interface 111 can also present awards 107, such as electronic gold stars, electronic badges, or user scores. In operation, if the user is accumulating money in the account for accumulating money, the server can provide the client device with a verbal award, a coupon, a promotional item, or the like. Third parties can use the awards 107 to encourage the user to spend the user's money within the account for accumulating money with the third party.

FIG. 7 depicts the data storage according to one or more embodiments.

The data storage 26 can have various portions of information and other data stored therein. For example, the data storage 26 can include a user profile 28 stored therein.

The user profile 28 can include financial information 54, a purchasing pattern 79, preset limits 106 for triggering alarms, information associated with purchases of products or services 112, a name 114 of the user, a social security number 115 for the user, a tax identification number 116 for the user, an address 117 for the user, a phone number 118 for the user, an email address 119 for the user, and a security question 120 associated with the user. The security question 120 can have a security question answer 121 linked thereto.

The data storage 26 can also include the library of agreements 137 and the web application 12 stored therein.

FIGS. 8A-8D depict the web application according to one or more embodiments.

The web application 12 can include a plurality of computer instructions. The plurality of computer instructions of the web application 12 can also form the client device application when stored in the client device.

The web application 12 can include computer instructions to present the user interface to the client devices 400.

The web application 12 can include computer instructions to enable users to login to the web application using: a preexisting social media identifier and a preexisting social media password or a preexisting third party site identifier and a preexisting third party password, and using a link to a social media service associated with the preexisting social media identifier and the preexisting social media password or a link to a third party service associated with the preexisting third party site identifier and the preexisting third party password 401.

The web application 12 can include computer instructions to link to the social media service or the third party service and import the user profile therefrom into the web application 402.

The web application 12 can include computer instructions to create a login with a new user identifier and a new password 403.

The web application 12 can include computer instructions to download a client device application from a phone application source or the web application, allow the client device application to communicate with the web application via the network, and enable creation of the user profile independent of the social media service or the third party service 404.

The web application 12 can include computer instructions to create a login with the new user identifier and new password using the client device application preloaded onto the client device, and enable for creation of the user profile independent of the social media service or the third party service 405.

The web application 12 can include computer instructions to create the account for accumulating money and link the account for accumulating money to the user profile stored in the client device application, the server, the cloud storage, or combinations thereof 406.

The web application 12 can include computer instructions to receive and store financial information from the user in the user profile and link the account for accumulating money to the account 407.

For example, the financial information can include a name of a financial intuition operating the account, such as a name of a bank operating a debit account of the user's; an account number associated with the account, such as a bank account number; and other information related to the account; thereby allowing the web application 12 to access the users account for linking to the account for accumulating money.

The web application 12 can include computer instructions to transfer money from the account into the account for accumulating money 408.

The web application 12 can include computer instructions to enable the user to insert goals into the user profile 409.

For example, the web application 12 can provide input fields in the user interface, allowing the user to operate the client device to insert the goals for storage in the user profile. The goals can be monetary goals to be accumulated by a certain date into the account for accumulating money, non-monetary goals to be completed by a certain date, or combinations thereof. In operation, upon completion of a non-monetary goal, the user can be allowed to deposit a monetary amount into the account for accumulating money, a third party can be allowed to deposit a monetary amount into the account for accumulating money on behalf of the user, or combinations thereof.

The web application 12 can include computer instructions to compute a monetary amount to be accumulated per unit of time in order to reach a monetary goal to be accumulated by a certain date, periodically recalculate the monetary amount to be accumulated per unit of time as deposits are made into the account for accumulating money, and present a recalculated monetary amount to be accumulated per unit of time in order to reach the monetary goal to be accumulated by a certain date on the client device 410.

The web application 12 can include computer instructions to enable the user to electronically make deposits into the account for accumulating money 411.

The deposits can be money from a gift card; from third parties for achieving goals; from third parties as an incentive or a rebate upon purchasing of an item, service, or combinations thereof; from a friend, from a family member, from another party related to the user; or combinations thereof.

The web application 12 can include computer instructions to enable the user to select the account from a plurality of accounts for transferring deposits of money into the account for accumulating money 412.

The web application 12 can include computer instructions to provide notices to the client device to verify initiation of fund transfers, deposits, or combinations thereof 413.

The web application 12 can include computer instructions to display on the client device deposits made within a preset period of time, the total amount of money accumulated to date, records of each deposit made into the account for accumulating money, a time and date for each deposit made into the account for accumulating money, or combinations thereof 414.

The web application 12 can include computer instructions to present prompts to the user via the client device 415.

The web application 12 can include computer instructions to display the current balance in the account for accumulating money along with the progress towards the goal 416.

The web application 12 can include computer instructions to identify the transfer destination for receiving transfers of money from the account for accumulating money 417.

The web application 12 can include computer instructions to enable the user to select a monetary amount to be transferred from the account for accumulating money to the transfer destination 418.

The web application 12 can include computer instructions to transfer all or portions of the money in the account for accumulating money 419.

The web application 12 can include computer instructions to simultaneously display multiple goals and progress towards the multiple goals 420.

The web application 12 can include computer instructions to enable the user to select the make the deposit button to initiate the deposit into the account for accumulating money 421.

The web application 12 can include to configure the client device application to be operable while connected to the network and while disconnected from the network 422.

The web application 12 can include computer instructions to store and present the agreements screen from the library of agreements to the user in the client device 424.

The web application 12 can include computer instructions to provide alarms to the client devices when, during a predefined time period, the account for accumulating money has not received deposits sufficient to accumulate any monetary amount to be accumulated by a certain date 425.

The web application 12 can include computer instructions to provide celebration indicators to the client device when the user achieves the goal, and to provide cost effective celebration suggestions to the client device 426.

The web application 12 can include computer instructions to periodically provide a tip to the client device on how to save money 427.

The web application 12 can include computer instructions to enable the user to link to the social media account through the network to share in celebration, share tips, or combinations thereof 428.

The web application 12 can include computer instructions to create a vector based score from deposit information in the user profile, goal information in the user profile, and progress information in the user profile 429.

For example, the vector based score can be created using singular value decomposition or a similar method for vectorizing the deposit information, goal information, and progress information in the user profile; and for analyzing and comparing the vectorized information from the user profile for similarities. The vector based scores can be provided to the users associated with the user profiles.

The deposit information can include information about deposits made by the user, including but not limited to a frequency of deposits, a size of deposits, and the like.

The goal information can include information about goals set by the user, including but not limited to types of goals, monetary amount of goals, monetary amounts associated with the goals, frequency of achievement of goals, time frames set for goals, number of goals, size of goals, and the like.

The progress information can include information about progress towards the goals, including but not limited to the rate of progress, measurements of progress, and the like.

The web application 12 can include computer instructions to enable the user to request a comparison of the user's progress towards the goal to other users' progress towards goals, and present the comparison to the client device 430.

For example, the web application 12 can receive a request through the user interface from the user to perform a comparison. The web application 12 can compare the user's rate of accumulating money in the account for accumulating money to another user's rate of accumulating money in the other user's account for accumulating money, such as by determining a numerical difference between the rates. The web application 12 can present the comparison to the client device.

The web application 12 can include computer instructions to enable an employer of the user to match the deposits made by the user into the account for accumulating money 431.

The web application 12 can include computer instructions to compute if the user meets a preset limit for receiving an award using the user's progress towards the goal and a rate of progress towards the goal 432.

For example, if the user's progress towards the goal is at a rate that is higher than necessary to reach the goal, the award can be provided.

The web application 12 can include computer instructions to enable third parties to provide offers to the user 433.

For example, third parties can present discounts, benefits, or combinations thereof for spending monetary amounts to be accumulated in the user interface.

The web application 12 can include computer instructions to allow linking of the account for accumulating money to at least one debit card account, a credit card account, or combinations thereof; receive information associated with purchases of products or services made using the at least one debit card account, the credit card account, or combinations thereof in the user profile; and track the user's purchases of products or services 434.

The web application 12 can include computer instructions to automatically deposit a preset amount of money into the account for accumulating money each time a debit card account, a credit card, or combinations is used for purchases, refunds, or combinations thereof 444.

Figure 9C:
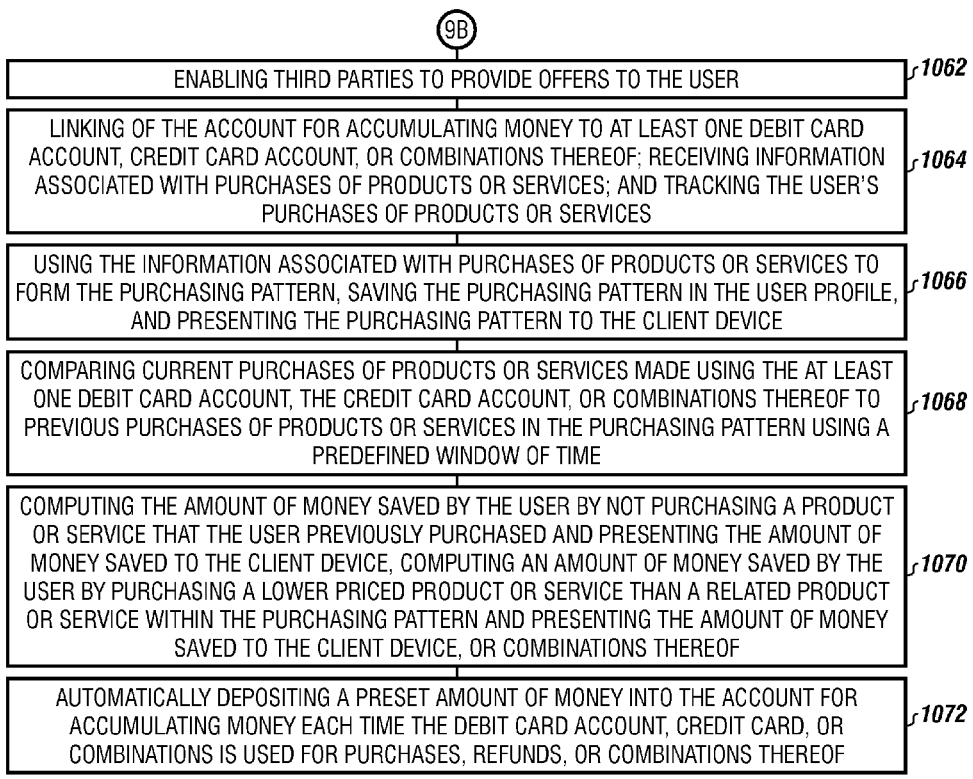

FIGS. 9A-9C depict an embodiment of the computer implemented method for accumulating money using the web application.

The method can include presenting the user interface to the client device, as illustrated by box 1000.

The method can include enabling the user to login to the web application, as illustrated by box 1002.

The method can include linking to the social media service or the third party service, as illustrated by box 1004

The method can include importing the user profile into the web application or enabling the user to form the user profile, as illustrated by box 1006.

The method can include preloading the client device application onto the client device or enabling downloading of the client device application from the phone application source or the web application, and enabling communication between the client device application and web application via the network, as illustrated by box 1008.

The method can include creating the account for accumulating money, linking the account for accumulating money to the user profile, and storing the user profile in the client device application, server, cloud storage, or combinations thereof, as illustrated by box 1010.

The method can include receiving and storing financial information from the user in the user profile, and linking the account for accumulating money to the account, as illustrated by box 1012.

The method can include transferring money from the account into the account for accumulating money, as illustrated by box 1014.

The method can include enabling the user to insert goals into the user profile, allowing deposits of a monetary amount into the account for accumulating money by the user, allowing deposits of a monetary amount into the account for accumulating money by a third party on behalf of the user upon completion of the goals, or combinations thereof, as illustrated by box 1016.

The method can include computing a monetary amount to be accumulated per unit of time in order to reach monetary goals to be accumulated by a certain date, as illustrated by box 1018.

The method can include periodically recalculating the monetary amount to be accumulated per unit of time as deposits are made into the account for accumulating money, as illustrated by box 1020.

The method can include presenting a recalculated monetary amount to be accumulated per unit of time in order to reach monetary goals to be accumulated by a certain date on the client device, as illustrated by box 1022.

The method can include enabling the user to electronically make deposits into the account for accumulating money, and enabling the user to select the account from a plurality of accounts for transferring deposits of money into the account for accumulating money, as illustrated by box 1024.

The method can include providing notices to the client device to verify initiation of fund transfers, deposits, or combinations thereof, as illustrated by box 1026.

The method can include displaying on the client device: deposits made within a preset period of time, the total amount of money accumulated to date, records of each deposit made into the account for accumulating money, the time and date for each deposit made into the account for accumulating money, or combinations thereof, as illustrated by box 1028.

The method can include presenting prompts to the user via the client device, as illustrated by box 1030.

The method can include presenting: the welcome screen, check my balance button, transfer destination selector, transfer amount selector, make a deposit button, transfer now button, or combinations thereof in the user interface, as illustrated by box 1032.

The method can include enabling the user to initiate deposits into the account for accumulating money, displaying the current balance along with the progress towards the goal, and transferring all or portions of the money in the account for accumulating money to the transfer destination, as illustrated by box 1034.

The method can include simultaneously displaying multiple goals and progress towards the multiple goals, as illustrated by box 1036.

The method can include presenting the progress as a digital graphical display, pie chart, bar graph, chart, table, graph, visual display of a non-monetary goal indicator, or combinations thereof, as illustrated by box 1038.

The method can include storing and presenting the agreements screen from the library of agreements to the user in the client device, as illustrated by box 1040.

The method can include providing alarms to the client device, as illustrated by box 1042.

The method can include providing celebration indicators to the client device, as illustrated by box 1044.

The method can include providing cost effective celebration suggestions to the client device, as illustrated by box 1046.

The method can include periodically providing tips to the client device on how to save money, as illustrated by box 1048.

The method can include enabling the user to link to the social media account through the network to share in celebration, share tips, or combinations thereof, as illustrated by box 1050.

The method can include enabling the client device application to be operable while connected to the network and while disconnected from the network, as illustrated by box 1052.

The method can include creating the vector based score, as illustrated by box 1054.

The method can include presenting the comparison to the client device, as illustrated by box 1056.

The method can include enabling employers of the user to match the deposits made by the user into the account for accumulating money, as illustrated by box 1058.

The method can include computing if the user meets the preset limit for receiving the award, as illustrated by box 1060.

The method can include enabling third parties to provide offers to the user, as illustrated by box 1062.

The method can include linking of the account for accumulating money to at least one debit card account, credit card account, or combinations thereof; receiving information associated with purchases of products or services; and tracking the user's purchases of products or services, as illustrated by box 1064.

The method can include using the information associated with purchases of products or services to form the purchasing pattern, saving the purchasing pattern in the user profile, and presenting the purchasing pattern to the client device, as illustrated by box 1066.

The method can include comparing current purchases of products or services made using the at least one debit card account, the credit card account, or combinations thereof to previous purchases of products or services in the purchasing pattern using a predefined window of time, as illustrated by box 1068.

The method can include computing the amount of money saved by the user by not purchasing a product or service that the user previously purchased and presenting the amount of money saved to the client device, computing an amount of money saved by the user by purchasing a lower priced product or service than a related product or service within the purchasing pattern and presenting the amount of money saved to the client device, or combinations thereof, as illustrated by box 1070.

The method can include automatically depositing a preset amount of money into the account for accumulating money each time the debit card account, credit card, or combinations is used for purchases, refunds, or combinations thereof, as illustrated by box 1072.

While these embodiments have been described with emphasis on the embodiments, it should be understood that within the scope of the appended claims, the embodiments might be practiced other than as specifically described herein.

What is claimed is:

1. A computer implemented method for accumulating money using a web application stored in a server accessible using a client device having a processor and a data storage for bidirectional communication through a network, the computer implemented method using a plurality of computer instructions in the data storage comprising:
   a. using computer instructions to present a user interface to the client device;
   b. using:
      (i) computer instructions to enable a user to login to the web application using: a preexisting social media identifier and a preexisting social media password or a preexisting third party site identifier and a preexisting third party password, and using a link to a social media service associated with the preexisting social media identifier and the preexisting social media password or a link to a third party service associated with the preexisting third party site identifier and the preexisting third party password;
      (ii) computer instructions to link to the social media service or the third party service and import a user profile therefrom into the web application;
      (iii) computer instructions to create a login with a new user identifier and a new password;
      (iv) computer instructions to download a client device application from a phone application source or the web application, wherein the client device application communicates with the web application via the network and enables creation of the user profile independent of the social media service or the third party service;
      (v) computer instructions to create a login with the new user identifier and the new password using the client device application that is preloaded onto the client device, enabling for creation of the user profile independent of the social media service or the third party service; or
      (vi) combinations thereof;
   c. using computer instructions to create an account for accumulating money and link the account for accumulating money to the user profile, wherein the user profile is stored in the client device application, the server, a cloud storage, or combinations thereof;
d. using computer instructions to receive and store financial information from the user in the user profile for linking a financial account associated with the financial information to the account for accumulating money;
e. using computer instructions to transfer money in incremental amounts from the financial account into the account for accumulating money as a non-spending decision occurs or as a savings decision occurs;
f. using computer instructions to enable the user to insert two goals into the user profile:
   (i) a monetary goal to be accumulated by a certain date, wherein the monetary goal is a monetary money amount to be accumulated into the account for accumulating money;
   (ii) a non-monetary goal to be completed by a certain date, wherein, upon completion of the non-monetary goal, the user is allowed to deposit a monetary money amount associated with the non-monetary goal into the account for accumulating money, a third party is only allowed to deposit the monetary money amount associated with the non-monetary goal into the account for accumulating money on behalf of the user when the non-monetary goal is achieved, or combinations thereof and accepting deposits from the third party only when the non-monetary goal is completed; or
   (iii) combinations thereof simultaneously;
g. using computer instructions to compute the monetary money amount to be accumulated in the account for accumulating money per unit of time in order to reach the goal, and periodically recalculate the monetary money amount to be accumulated per unit of time, and present a recalculated monetary money amount to be accumulated per unit of time in order to reach the goal on the client device; and
h. using computer instructions to enable the user to electronically make or receive money deposits into the account for accumulating money, wherein the money deposits comprise:
   (i) money from a gift card;
   (ii) money from the third party or another third party for achieving the goal;
   (iii) money from the third party or another third party as an incentive or a rebate to the user upon purchasing of an item, service, or combinations thereof only if the user has met the monetary goal;
   (iv) money from a friend, a family member, another party related to the user; or
   (v) combinations thereof;
i. computer instructions to display multiple goals and progress towards the multiple goals in the user interface, and the progress towards the monetary goal and the non-monetary goal is presented as a digital graphical display, a pie chart, a bar graph, a chart, a table, a graph, a visual display of a non-monetary goal indicator, or combinations thereof; and
j. computer instructions to provide an alarm to the client device when, during a predefined time period, the account for accumulating money has not received deposits sufficient to accumulate the monetary money amount to be accumulated by a certain date.

2. The computer implemented method of claim 1, using as the account for accumulating money a member of a group consisting of: an account at a financial institution, a savings account, a checking account, a debit account, a credit card account, a direct deposit account, another financial account eligible for transferring the deposits into the account for accumulating money, a third party financial account, a gift card account, a bank account, a credit union account, a billing account, a phone bill account, a utilities account, and combinations thereof.

3. The computer implemented method of claim 1, further comprising:
a. using computer instructions to enable the user to select the account from a plurality of accounts for transferring deposits of money into the account for accumulating money;
b. using computer instructions to provide a notice to the client device to verify initiation of fund transfers, deposits, or combinations thereof; and
c. using computer instructions to display on the client device of at least one of:
   (i) deposits made within a preset period of time;
   (ii) a total amount of money accumulated to date;
   (iii) a record each deposit made into the account for accumulating money; and
   (iv) a time and date for each deposit made into the account for accumulating money.

4. The computer implemented method of claim 1, further comprising using computer instructions to present prompts to the user via the client device, using prompts selected from a group consisting of:
a. a prompt to not buy a product or service, and to save an amount of money equivalent to the product or service not purchased into the account for accumulating money;
b. a prompt to buy a lower priced product or service as a substitute for a higher priced product or service, and to save an amount of money equivalent to the difference between the higher price and the lower price into the account for accumulating money;
c. a bill paying prompt to:
   (i) save an amount of money while paying a bill or save on fees associated with the bill;
   (ii) pay a bill early and initiate a transfer of an amount of money equivalent to a late fee or a finance charge into the account for accumulating money, the late fee or finance charge is associated with paying the bill late;
   (iii) pay a bill early to raise the user's credit score;
   (iv) cease purchasing products or services not being fully utilized; and
   (v) consider a lower cost alternative associated with a bill; or
   (vi) combinations thereof; and
d. combinations thereof.

5. The computer implemented method of claim 1, further comprising presenting in the user interface a member of a group consisting of:
a. a welcome screen;
b. a make a deposit button for actuating computer instructions to enable the user to select a the make a deposit button to initiate deposits into the account for accumulating money;
c. a check my balance button for actuating computer instructions to display a current balance in the account for accumulating money along with a progress towards the goal;
d. a transfer destination selector for actuating computer instructions to identify a transfer destination for receiving transfers of money from the account for accumulating money;
e. a transfer amount selector for actuating computer instructions to enable the user to select the monetary money amount to be transferred from the account for accumulating money to the transfer destination;
f. a transfer now button for actuating computer instructions to transfer all or portions of the money in the account for accumulating money; and
g. combinations thereof.

6. The computer implemented method of claim 5, using as the transfer destination an account with a financial service company, a bank account, a brokerage firm account, a mutual fund, an individual retirement account, a checking account, a savings account, an account with a precious metal broker, an account with a municipal bond broker, an account secured by treasury certificates, an account with a cruise line, an account with theme park, an account with a personal financial advisor, an account with a travel agency, an investment account, or combinations thereof.

7. The computer implemented method of claim 1, further comprising using computer instructions to store and present an agreements screen from a library of agreements to the user in the client device, using agreements comprising:
   a. a signup agreement for the user to obtain a license to use the web application;
   b. an account linking agreement that links a financial institution, a third party, or combinations thereof to the account for accumulating money to enable the web application;
   c. an agreement regarding transfers of money that is an employer-employee agreement and enables a direct deposit service to deposit money into the account for accumulating money; and
   d. a social media agreement that links the social media service to the web application and the account for accumulating money.

8. The computer implemented method of claim 1, further comprising using computer instructions to provide celebration indicators to the client device when the user achieves the goal, wherein the celebration indicators comprise: an animated graphical display, words of praise, words of support, an audio indicator, a visual indicator, a textual indicator, or combinations thereof.

9. The computer implemented method of claim 8, further comprising using computer instructions to provide cost effective celebration suggestions to the client device, the cost effective celebration suggestions comprise: a coupon for a product or service, an instruction on how to receive a promotional item, or combinations thereof.

10. The computer implemented method of claim 1, further comprising using computer instructions to periodically provide a tip to the client device on how to save money.

11. The computer implemented method of claim 1, further comprising using computer instructions to enable the user to link to the social media service through the network to share in celebrations, tips, or combinations thereof.

12. The computer implemented method of claim 1, is operable when the client device application is connected to the network and while disconnected from the network.

13. The computer implemented method of claim 1, further comprising using computer instructions to create a vector based score from deposit information in the user profile, goal information in the user profile, and progress information in the user profile, wherein the vector based score ranks the user relative to other users.

14. The computer implemented method of claim 1, further comprising using computer instructions to enable the user to request a comparison of the user's progress towards the goal to other users' progress towards goals, and present the comparison to the client device.

15. The computer implemented method of claim 1, further comprising using computer instructions to enable an employer of the user to match deposits made by the user into the account for accumulating money.

16. The computer implemented method of claim 1, further comprising using computer instructions to compute if the user meets a preset limit for receiving an award using the user's progress towards the goal and a rate of progress towards the goal, wherein the award is an electronic gold star, an electronic badge, or a user score.

17. The computer implemented method of claim 1, has as a goal attendance at an event, attendance at a theme park, attendance on a cruise ship, taking a vacation, or combinations thereof.

18. The computer implemented method of claim 1, further comprising using computer instructions to enable third parties to provide offers to the user, using offers comprising: discounts, benefits, or combinations thereof for spending monetary money amounts to be accumulated.

19. The computer implemented method of claim 1, the user is selected from the group comprising: an individual, a group of individuals, a family, a business organization, or a non-profit organization.

20. The computer implemented method of claim 1, further comprising using computer instructions to allow linking of the account for accumulating money to a debit card account, a credit card account, or combinations thereof, wherein information associated with purchases of products or services made using the debit card account, the credit card account, or combinations thereof is transmitted to the user profile for tracking the user's purchases of products or services.

21. The computer implemented method of claim 20, further comprising:
   a. receiving and storing the information associated with purchases of products or services from the debit card account, the credit card account, or combinations thereof;
   b. using the information associated with purchases of products or services to form a purchasing pattern, saving the purchasing pattern in the user profile, and presenting the purchasing pattern to the client device; and
   c. comparing current purchases of products or services made using the debit card account, the credit card account, or combinations thereof to previous purchases of products or services in the purchasing pattern using a predefined window of time, and performing at least one of:
      (i) computing an amount of money saved by the user by not purchasing a product or service that the user previously purchased, and presenting the amount of money saved to the client device; and
      (ii) computing an amount of money saved by the user by purchasing a lower priced product or service than a related product or service within the purchasing pattern, and presenting the amount of money saved to the client device.

22. The computer implemented method of claim 20, further comprising using computer instructions to automatically deposit a preset amount of money into the account for accumulating money each time the debit card account, the credit card, or combinations thereof is used for purchases, refunds, or combinations thereof.

23. The computer implemented method of claim 1, using the user profile that comprises:
   a. a name of the user;
   b. a social security number of the user;
   c. a tax identification number of the user;

d. an address of the user;
e. a phone number of the user;
f. an email address associated with the user;
g. a security question to the user; or
h. combinations thereof.

\* \* \* \* \*